Figure 1:
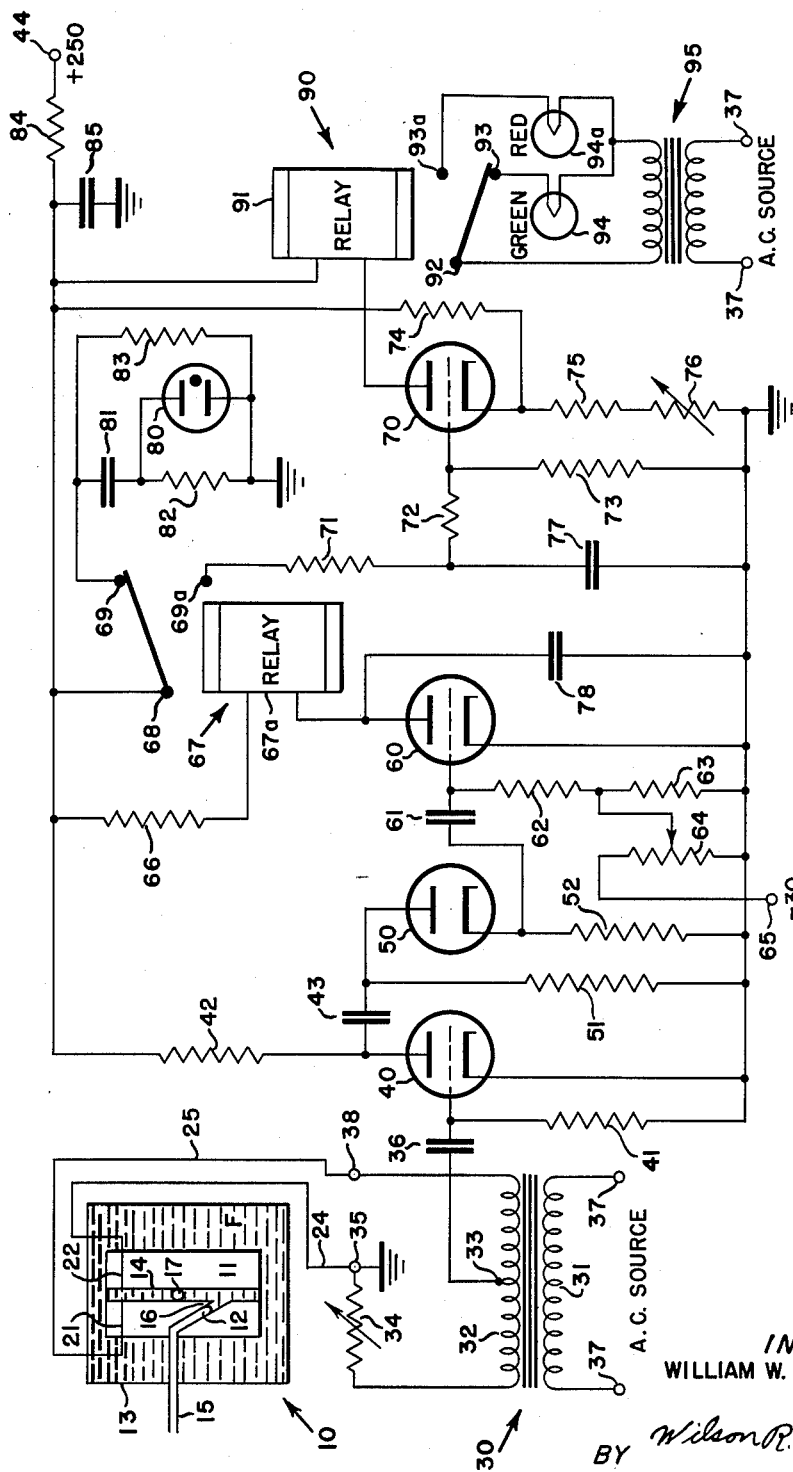

INVENTOR
WILLIAM W. BARTLETT
BY Wilson R. Maltby
ATTORNEY

Sept. 27, 1955      W. W. BARTLETT      2,719,287
ELECTRONIC GAS FLOWMETER

Filed July 31, 1953      2 Sheets-Sheet 2

*INVENTOR*
WILLIAM W. BARTLETT

BY Wilson R. Maltby

*ATTORNEY*

United States Patent Office 2,719,287
Patented Sept. 27, 1955

2,719,287

ELECTRONIC GAS FLOWMETER

William W. Bartlett, Newport, R. I., assignor to United States of America as represented by the Secretary of the Navy Application July 31, 1953, Serial No. 371,743

8 Claims. (Cl. 340—239)

(Granted under Title 35, U. S. Code (1952), sec. 266)

The invention described herein may be manufactured and used by or for the Government of the United States of America for governmental purposes without the payment of any royalties thereon or therefor.

This invention relates to metering the flow of gases and particularly to apparatus for correctly indicating a very slow flow or a very small quantity of gas per unit time. The measurement of gas flowing through pipes or orifices is a well-known art in so far as the measurements concern considerable quantities of gas to be measured, although the measuring devices are often complicated and expensive. However, commercial flow measuring instruments have a lower limit of the order of 1 to 10 milliliters of gas per minute. Lower rates of gas flow are ordinarily measured by bubbling the gas into an inverted liquid-filled transparent container and measuring the time interval to displace a known volume of liquid.

The present invention is directed to the formation of gas bubbles of uniform size in a liquid medium and to the detection and count of the bubbles individually as they pass through a measuring chamber and to derive therefrom an indication of the rate at which the bubbles are formed.

This invention is related to copending application, Serial No. 290,376, filed May 27, 1952, for "Electric Gas Flowmeter" by Bartlett and Smoot, now U. S. Patent No. 2,683,986, issued July 20, 1954.

The copending application discloses a liquid immersed measuring cell in which discrete bubbles of uniform size are formed in the liquid medium when gas under pressure in a sloping channel displaces liquid in a downward direction past a sharply angular intersection into a vertical channel. Insulated electrical electrodes in the vertical channel, when energized from a suitable potential source, provide means for detecting the passage of a gas bubble by producing a voltage pulse, and electronic or electric counters are disclosed responsive to the voltage pulses to record the total gas flow in terms of total pulses counted.

There are a number of circumstances where the measurement of the total gas flow is less important than information concerning the instantaneous rate of flow or the amount of gas flowing in a relatively limited interval of time. The present invention contemplates the use of the bubble-forming apparatus of the above-mentioned copending application in connection with an electronic circuit responsive to voltage pulses provided by the bubble-forming chamber to derive an indication of the rate of gas flow.

The prncipal object of the invention is to provide an electronic circuit responsive to voltage pulses to provide an indication of the rate at which the voltage pulses occur.

Another object of the invention is to provide an electronic circuit responsive to the occurrence of voltage pulses to provide an indication whenever the rate of occurrence of voltage pulses exceeds a predetermined value; or conversely to provide an indication whenever the rate of pulse occurrence falls below a predetermined value.

Another object of the invention is to provide an electronic circuit responsive to voltage pulses in which the indicated relationship between rate of flow and the predetermined value can be adjusted in accordance with measured ambient temperatures.

Figure 2:
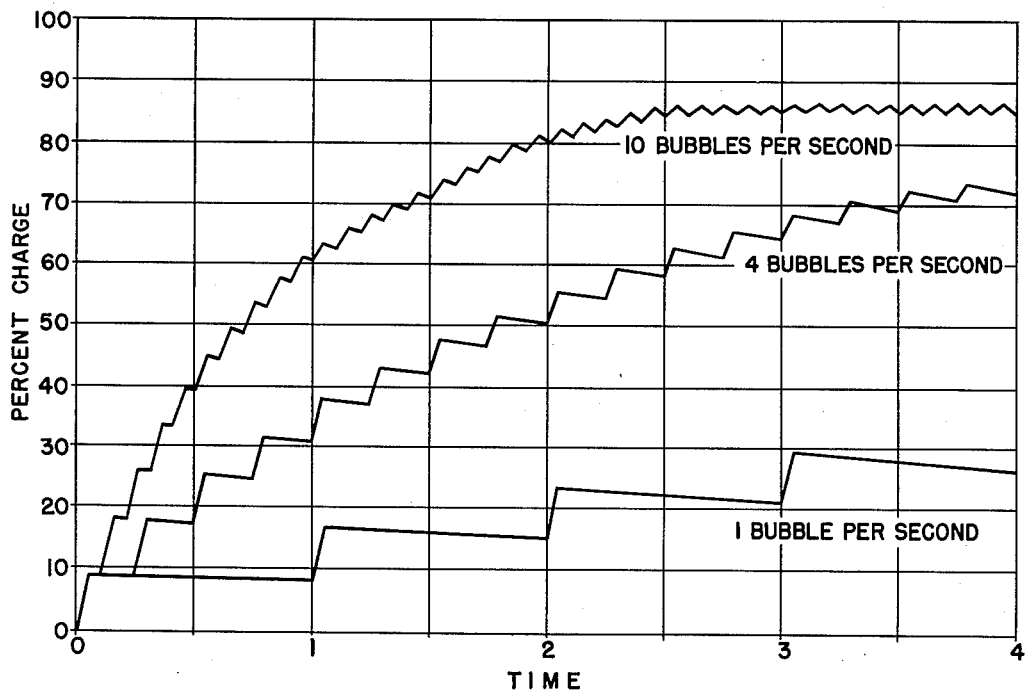
Figure 3:
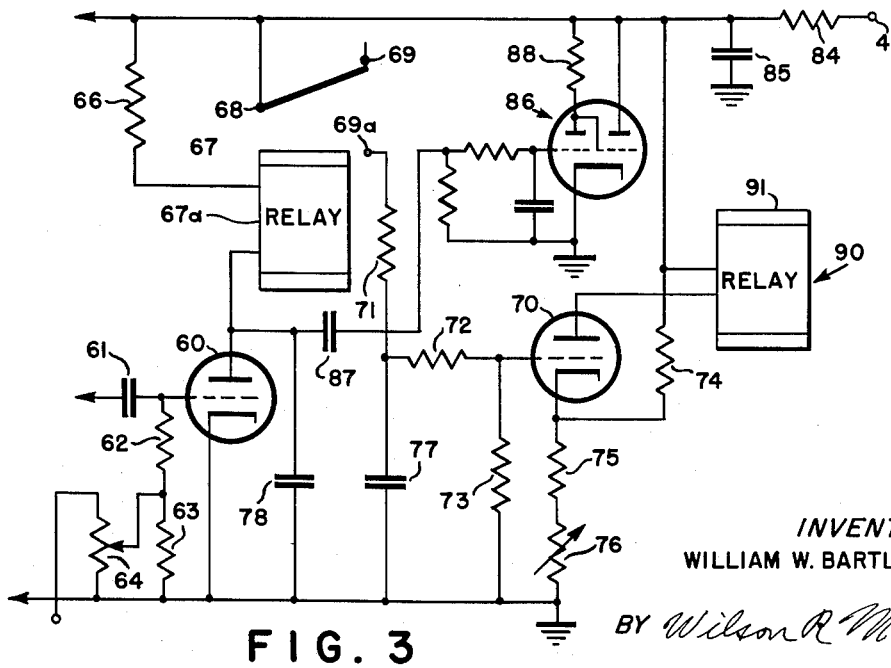

Other objects and many of the attendant advantages of this invention will readily be appreciated as the same becomes better understood by reference to the following detailed description when considered in connection with the accompanying drawings wherein Fig. 1 represents a schematic wiring diagram of a circuit embodying the features of the invention and wherein the measuring chamber is shown in sectional elevation;

Fig. 2 is a graph illustrating an operating characteristic of the circuit of Fig. 2; and Fig. 3 represents a modification in the indicator portion of the wiring diagram of Fig. 1.

In the drawings the gas-measuring cell generally indicated at 10 is shown immersed in a liquid medium F held in a container 13 of suitable size. The cell body 11 may be made of any suitable material which is unaffected by immersion in the liquid medium. A vertical channel 14 passes completely through the cell body 11. A downwardly sloping channel is formed starting at a selected point on the outer wall of cell body 11 to intersect the vertical channel 14 at a predetermined acute angle at point 16. Pipe 15 is attached to the cell body 11 such that it communicates directly with the sloping channel 12. The gas to be measured is introduced under pressure into measuring cell 10 by pipe 15. The gas under pressure forces the liquid level down in channel 12 and a bubble 17 is formed at point 16. The sharply angular edge of the intersection at point 16 acting against the buoyancy of the gas divides the gas volume into discrete portions of equal size. The bubble 17 rises and is directed upwardly through the vertical channel 14. Two diametrically opposed insulated electrodes 21 and 22 are brought through the wall of cell body 11 at points above intersection 16 and extend into vertical channel 14. In order to minimize the effect of electrolytic action on the electrodes, even though the energizing potential is taken from an alternating current source, the electrode tips extending into vertical channel 14 preferably are made from one of the noble metals such as platinum.

The electrical conductivity of this liquid medium F may be adjusted by the addition of small quantities of electrolyte to present a satisfactory value of resistance between electrodes 21 and 22. When ordinary tap water is the liquid medium, the resistance of the measuring cell is normally about 20,000 ohms and increases to approximately 100,000 ohms when a gas bubble passes the electrodes. If tap water is the liquid medium, it takes approximately $\frac{1}{30}$ to $\frac{1}{20}$ of a second for the gas bubble to pass electrodes 21 and 22.

The measuring cell electrodes 21 and 22 are energized in an alternating current bridge circuit. A transformer, generally indicated at 30, has a primary winding 31 connected at terminals 37 to a suitable source of alternating current power. A conventional 115-volt, 60-cycle alternating current line is satisfactory, although a 400-cycle line or higher frequency source may be used. The secondary winding 32 is provided with a center tap 33. One end of winding 32 is connected directly through terminal 38 and lead 25 to electrode 21. Electrode 22 is connected through lead 24 and terminal 35 to ground. The other end of winding 32 is connected through variable resistor 34 to terminal 35. Thus, a bridge circuit is formed by the two halves of secondary winding 32, variable resistor 34 and the bubble-measuring cell 10. Resistor 34 is adjusted to present the same resistance offered by measuring cell 10 so that the two halves of the bridge are balanced and there is substantially zero alternating current potential existing between center tap 33 and ground.

The output of the bridge circuit is coupled to triode 40 by connecting the center tap 33 through coupling capacitor 36 to the control grid of the triode which is grounded by a suitable grid leak resistor 41, the cathode of triode 40 also being grounded. Triode 40 is energized through anode load resistor 42 from a suitable constant voltage source indicated generally at terminal 44. The energizing potentials applied to triode 40 are such as to bias triode 40 so that it is normally highly conducting.

Whenever a bubble 17 rising upwardly in vertical channel 14 of measuring cell 10 passes between electrodes 21 and 22, the alternating current bridge balance is upset and an alternating voltage pulse is coupled to the control grid of triode 40 through coupling capacitor 36. Inasmuch as triode 40 is biased for conduction, the positive portion of the alternating voltage wave impressed on the control grid of triode 40 exerts little influence on the conduction of triode 40. However, the negative portion of the alternating voltage wave impressed on the control grid acts to bias triode 40 toward cutoff. This, in turn, reduces the current flowing though load resistor 42 and the voltage at the anode of triode 40 correspondingly increases so that each negative peak of alternating current impressed on the control grid produces a corresponding positive pulse at the anode of triode 40. These pulses are coupled by capacitor 43 to diode 50 and thus produce a positive voltage across resistor 52 in the cathode circuit of diode 50.

Triode 60 has its cathode directly grounded and a bias voltage is applied to its control grid through a voltage divider network 62 and 63 connected between its control grid and ground and through the variable contact of potentiometer 64 connected between ground and a source of negative potential (not shown) connected to terminal 65. The anode of triode 60 is connected to the energizing coil 67a of a relay, generally indicated at 67, and through series connected load resistor 66 to constant potential source 44. Triode 60 is biased to be normally nonconducting, thereby holding relay 67 with its armature in its de-energized position. By means of this position of relay armature, a neon glow tube 80, shunted by resistor 82 and in series with capacitor 81, is connected through contact 69 and armature 68 between ground and the source of constant potential at terminal 44. When so connected, capacitor 81 receives a charge from the source of constant potential and the flow of charging current through resistor 82 establishes a voltage drop therethrough which is applied to neon glow tube 80 causing it to "fire." When capacitor 81 is charged such that the charging current flowing through resistor 82 has a voltage drop below the extinguishing potential for neon glow tube 80, neon glow tube 80 ceases to glow and cannot again fire while capacitor 81 remains charged.

Triode 70 is arranged with its control grid connected in a voltage divider network composed of resistors 71, 72 and 73. The cathode of triode 70 is biased by a voltage divider network connected between constant potential source 44 and ground and composed of resistors 74, 75 and 76 having values selected so that triode 70 is normally nonconducting. The anode of triode 70 is connected through the energizing coil 91 of the relay indicated generally at 90 to constant potential source 44. Whenever relay 67 is energized by the conduction of triode 60 so that armature 68 makes contact with contact 69a, current flows from constant potential source 44 through resistors 71, 72 and 73 and a voltage drop appears at the juncture of resistors 71 and 72. There is thus provided a source of charging potential for capacitor 77 and its charging current flowing through resistor 71 creates an additional voltage drop thereacross.

In the intervals when triode 60 is not conducting and relay 67 is de-energized, the charge on capacitor 77 is discharged through resistors 72 and 73. Capacitor 77 and resistors 71, 72 and 73 may be considered to perform the function of an integrator. The charge on capacitor 77 is accumulated in increments each of which corresponds with the passage of a bubble past electrodes 21 and 22 while the charge continuously is dissipated through resistors 72 and 73.

Fig. 2 is a graph illustrating the operating characteristics of the integrator circuit in which typical values for the circuit are as follows:

Capacitor 77 _____ 1.0 mfd.
R-71 _____ 0.5 megohm.
R-72 _____ 10 megohms.
R-73 _____ 10.5 megohm.

For these values the time constant of the charging circuit of resistor 71 and capacitor 77 is one-half second and the time constant of the discharging circuit through resistor 72 and resistor 73 is ten seconds. In Fig. 2 ordinate "100" represents the maximum total charge reached by capacitor 77 if it is permanently connected to the constant potential at terminal 44. Fig. 2 shows the per cent of maximum charge which appears on capacitor 77 with time for bubble rates of one bubble per second, four bubbles per second and ten bubbles per second. It is assumed, in the time interval of approximately 1/20 of a second during which the gas bubble is passing electrodes 21 and 22, that capacitor 77 receives a definite increment of charge related to the time constant of the charging circuit and the applied voltage. The charge on capacitor 77 is partially dissipated during the time interval between bubbles at a rate determined by the potential of charge and the time constant of the discharge circuit. Thus it is seen that, in accordance with the rate of occurrence of bubbles, increments of charge are added to increase the potential of charge of capacitor 77 until the potential of charge reaches a magnitude where the loss of charge in the time inteval between bubbles equals the increase of charge during the time of occurrence of a bubble, at which magnitude the charge accumulated by capacitor 77 approaches a steady-state condition characteristic of the particular rate of flow of gas. Further, it is seen that the steady-state charge reached by capacitor 77 at a constant rate of bubble formation is related exponentially to the repetition frequency of the applied voltage pulses which represent bubbles.

It is also to be noted that when relay 67 is energized so that armature 68 is connected to contact 69a, capacitor 81 is discharged through resistor 83 to ground and the indicator circuit is thereby conditioned so that neon glow tube 80 can "fire" to indicate the passage of the bubble, when triode 60 ceases to conduct and relay 67 is de-energized, thereby again connecting capacitor 81 to the source of constant potential at terminal 44 through contact 69 and armature 68.

Relay 90 in its de-energized state, as shown, positions armature 92 to connect to contact 93 and causes lamp 94 to be lighted from the secondary of the transformer generally indicated at 95. When energized, relay 90 serves to position armature 92 to connect to contact 93a and causes lamp 94a to be lighted from the secondary transformer 95 and lamp 94 to be extinguished. It is thus seen that each passage of a bubble through measuring chamber 10 serves by unbalancing bridge 30 to produce a pulse which acts to change triode 60 from a nonconducting state to a conducting state and to energize relay 67. Relay 67, when energized for the period of time of the passage of the bubble past electrodes 21 and 22, connects capacitor 77 to terminal 44 for charging through resistor 71. When the bubble passes electrodes 21 and 22, the alternating current bridge is restored to balance, triode 40 resumes maximum conduction, triode 60 is biased to nonconduction, the relay 67 is de-energized, the armature 68 is restored to make contact with contact 69 and the indicator associated with tube 60 operates, thereby indicating the passage of a bubble. If the rate of flow of gas increases, as shown in Fig. 2, a charge potential is reached, established by the initial bias conditions, such that triode 70 becomes biased to conduction thereby energizing relay 90. When relay 90 is energized, a signal lamp 94 is extinguished and a signal lamp 94a is lighted, thereby serving notice that the rate of flow of gas has exceeded a value determined by the bias established initially on triode 70.

In the above description with respect to the alternating current bridge circuit, it was noted that for normal operation in the absence of a bubble the alternating current bridge is balanced by adjustment of resistor 34 so that substantially zero potential exists between center tap 33 and ground. While it is easy to balance the bridge in this fashion with suitable auxiliary test equipment, a modification of the indicator circuit of Fig. 1 is disclosed in Fig. 3 so that the same indicator which displays the time of occurrence of a bubble is of a type which can also be useful to serve as a null balance indicator for the alternating current bridge circuit. For example, the alternating current bridge may be energized with approximately 6 volts from the secondary winding of transformer 30 and for a change in cell resistance from 20,000 ohms to 100,000 ohms an unbalance potential of approximately 2 volts appears between ground and tap 33 of the alternating current bridge. These values provide sufficient voltage change so that an electron ray tube or so-called "magic-eye" tube may serve as a null balance indicator. In Fig. 3 the electron ray tube, such as a 6E5, is indicated as tube 86 to monitor the potential applied to triode 60. The electron ray tube is energized in conventional fashion by connection to the high voltage source at terminal 44, and its control grid is coupled through capacitor 87 to the plate of triode 60. When triode 60 is biased to be normally nonconducting, as it is in the absence of a bubble, the control grid of electron ray tube 86 is at or near the plate potential and the tube display is a wide angular shadow. When triode 60 is biased to conduction by the occurrence of a bubble, represented by a pulse applied through capacitor 61 to bias triode 60 to conduction, the flow of current through triode 60 creates a voltage drop across relay coil 67A and resistor 66 which is applied through capacitor 87 as a negative potential to the control grid of electron ray tube 86. This causes the tube display to narrow. Electron ray tube 86 thus serves to indicate each passage of a bubble through measuring chamber 10 by a change in the display of the tube from a wide angle to a narrow angle and back to a wide angle again as the bubble has passed electrodes 21 and 22.

With the connection shown in Fig. 3, electron ray tube 86 also serves as a null balance indicator for the bridge circuit in the following manner. Should the alternating bridge current circuit become unbalanced for any reason, a small alternating current potential is applied to the grid of triode 40, thereby changing the plate current of triode 40, applying voltage pulses to diode 50 and establishing bias conditions across resistor 52 to bias tube 60 to conduction. Under these conditions, the electron ray tube display, instead of being a sharp clearly defined wide angle, becomes narrower in proportion to the degree of unbalance which exists at the alternating current bridge. Adjustment of resistor 34 can be made to restore the indication of the electron ray tube 86 to its widest angle, a bridge balance adjustment which can be rapidly and easily made.

In the event that the device is used for the purpose of measuring the rate of a chemical reaction having a gaseous reaction product, a reaction rate which is desirable at a given temperature, will be changed if the reaction takes place at an elevated temperature or a depressed temperature. Conversely, a reaction proceeding under conditions producing a satisfactory rate at a given temperature, may be equally satisfactory at a differing rate provided only temperature changed. Accordingly, when the present invention is being used to indicate that the rate of gas flow has exceeded or fallen below a predetermined amount, such indication will be satisfactory only for a particular value of ambient temperature. It may be expedient, therefore, to change the value of rate of flow for which triode 70 becomes conducting in accordance with the relationship between chemical reaction rate and ambient temperature. It has been found that this change can be accomplished easily because the relationship between chemical reaction rate and temperature often is expressed as $$K_{T_2} = K_{T_1} Q^{\frac{T_2 - T_1}{10}}$$

an exponential curve which may be matched approximately by the exponential charge-discharge curve of a capacitor. Accordingly, compensation for variations in ambient temperature may be obtained manually by an adjustment of resistor 76 through a suitable range of values to change the bias on triode 70 so that a greater or lesser amount of charge is required on capacitor 77 to cause triode 70 to conduct in accordance with the known chemical reaction rate of change with change of ambient temperature.

Obviously, the several electron tube circuits can be biased for operation other than as described. For example, triode 60 can be biased to be normally conducting and the connections of diode 50 reversed so that the occurrence of a bubble produces voltage pulses which are applied to bias triode 60 to nonconduction. In this instance, the connections to contacts 69 and 69a would also be reversed to obtain operation of the indicators as described above.

Obviously many other modifications and variations of the present invention are possible in the light of the above teachings. It is therefore to be understood that within the scope of the appended claims the invention may be practiced otherwise than as specifically described.

What is claimed is:

1. In volumetric gas flow measuring apparatus of the bubbling type wherein the flow of gas being measured is caused to pass in discrete volumes through a body of liquid, a rate-of-flow measuring circuit comprising a source of alternating current power, a bubble forming cell having electrodes energized from said source and responsive to each gas bubble to produce a voltage pulse, a first normally nonconducting electron tube responsive to each of said pulses and biased thereby to become conductive for the time duration of said pulse, an integrator circuit responsive to the conduction of said first electron tube to produce an output potential having an amplitude corresponding to the rate of occurrence of said pulses, a second normally nonconducting electron tube responsive to said integrator output potential and biased thereby to become conducting at a predetermined amplitude of said potential corresponding to a selected rate of bubble formation, and an indicator responsive to the conduction of said first and second electron tubes whereby the rate of bubble formation is compared to said selected rate and the occurrence of each bubble is displayed.

2. In volumetric gas flow measuring apparatus of the bubbling type wherein the flow of gas being measured is caused to pass in discrete volumes through a body of liquid, a rate-of-flow measuring circuit comprising a source of alternating current power, a bubble forming cell having electrodes energized from said source and responsive to each gas bubble to produce a voltage pulse, a first normally nonconducting electron tube responsive to each of said pulses and biased thereby to become conductive for the time duration of said pulse, an integrator circuit responsive to the conduction of said first electron tube to produce an output potential having an amplitude corresponding to the rate of occurrence of said pulses, a second normally nonconducting electron tube responsive to said integrator output potential and biased thereby to become conducting at a predetermined amplitude of said potential corresponding to a selected rate of bubble formation, an indicator responsive to the conduction of said first and second electron tubes whereby the rate of bubble formation is compared to said selected rate and the occurrence of each bubble is displayed, and means for adjusting the bias of said second tube to compensate the selected rate for changes in ambient temperature.

3. In volumetric gas flow measuring apparatus of the bubbling type wherein the flow of gas being measured is caused to pass in discrete volumes through a body of liquid, a rate-of-flow measuring circuit comprising a source of energizing potentials, a bubble forming cell having electrodes energized from said source and responsive to the passage of gas bubbles to produce a voltage pulse with a time duration corresponding to the passage of a gas bubble by said electrodes, first and second electron tubes biased from said source to be normally nonconducting, means responsive to said voltage pulses to bias said first electron tube to conduction for the time duration of said pulse, an integrator circuit responsive to the conduction of said first electron tube to produce an output potential having an amplitude corresponding to the rate of occurrence of said pulses, means applying said integrator output potential to bias said electron tube to conduction at a predetermined amplitude of said potential corresponding to a selected rate of bubble formation, a first indicator responsive to the conduction of said first electron tube to display the occurrence of a bubble, and a second indicator responsive to the conduction of said second electron tube to compare said rate of bubble formation to said selected rate.

4. In volumetric gas flow measuring apparatus of the bubbling type wherein the flow of gas being measured is caused to pass in discrete volumes through a body of liquid, a rate-of-flow measuring circuit comprising a source of energizing potentials, a bubble forming cell having electrodes energized from said source and responsive to the passage of gas bubbles to produce a voltage pulse with a time duration corresponding to the passage of a gas bubble by said eelctrodes, first and second electron tubes biased from said source to be normally nonconducting, means responsive to said voltage pulses to bias said first electron tube to conduction for the time duration of said pulse, an integrator circuit responsive to the conduction of said first electron tube to produce an output potential having an amplitude corresponding to the rate of occurrence of said pulses, means applying said integrator output potential to bias said electron tube to conduction at a predetermined amplitude of said potential corresponding to a selected rate of bubble formation, a first indicator responsive to the conduction of said first electron tube to display the occurrence of a bubble, a second indicator responsive to the conduction of said second electron tube to compare said rate of bubble formation rate to said selected rate, and means for adjusting the bias of said second tube to compensate the indicated rate for changes in ambient temperature.

5. In volumetric gas flow measuring apparatus of the bubbling type wherein the flow of gas being measured is caused to pass in discrete volumes through a body of liquid, a rate-of-flow measuring circuit comprising a source of energizing potentials, a bubble forming cell adapted to divide the flow of gas into discrete bubbles of uniform size and having electrodes arranged to detect the passage of each gas bubble, first and second electron tubes biased from said source to be normally nonconducting, a normally balanced alternating current bridge, means for connecting said electrodes of said measuring cell into one arm of said bridge such that the passage of a gas bubble through said measuring cell unbalances said bridge to produce a voltage pulse having a duration time corresponding to the time of passage of said bubble by said electrodes, means responsive to said voltage pulses to bias said first electron tube to conduction for the time duration of said pulse, means responsive to the conduction of said first electron tube to produce an output potential having an amplitude corresponding to the rate of occurrence of said voltage pulses, means for applying said output potential to bias said second electron tube to conduction at a predetermined rate of occurrence of said voltage pulses, a first indicator responsive to the conduction of said first electron tube to display the time of occurrence of a bubble, and a second indicator responsive to the conduction of said second electron tube to provide an indication that the rate of occurrence of bubble formation has exceeded said predetermined rate.

6. In volumetric gas flow measuring apparatus of the bubbling type wherein the flow of gas being measured is caused to pass in discrete volumes through a body of liquid, a rate-of-flow measuring circuit comprising a source of energizing potentials, a bubble forming cell adapted to divide the flow of gas into discrete bubbles of uniform size and having electrodes arranged to detect the passage of each gas bubble, first and second electron tubes biased from said source to be normaly nonconducting, a normally balanced alternating current bridge, means for connecting said electrodes of said measuring cell into one arm of said bridge such that the passage of a gas bubble through said measuring cell unbalances said bridge to produce a voltage pulse having a duration time corresponding to the time of passage of said bubble by said electrodes, means responsive to said voltage pulses to bias said first electron tube to conduction for the time duration of said pulse, means responsive to the conduction of said first electron tube to produce an output potential having an amplitude corresponding to the rate of occurrence of said voltage pulses, means for applying said output potential to bias said second electron tube to conduction at a predetermined rate of occurrence of said voltage pulses, a first indicator responsive to the conduction of said first electron tube to display the time of occurrence of a bubble, a second indicator responsive to the conduction of said second electron tube to provide an indication that the rate of occurrence of bubble formation has exceeded said predetermined rate, and means for adjusting the bias of said second tube to compensate the indicated rate for changes in ambient temperature.

7. In volumetric gas flow measuring apparatus of the bubbling type wherein the flow of gas being measured is caused to pass in discrete volumes through a body of liquid, a rate-of-flow measuring circuit comprising, a normally balanced alternating current bridge, a measuring cell adapted to divide the flow of gas into discrete bubbles of uniform size and having electrodes arranged to detect the passage of each gas bubble so formed, means for connecting said measuring cell into one arm of said bridge such that the passage of a gas bubble through said measuring cell unbalances said bridge to produce a voltage pulse having a time of duration corresponding to the time of passage of said bubble by said electrode, a source of energizing potentials, a first electron tube biased from said source to be normally nonconducting, a first relay connected in the anode circuit of said first tube and energized upon conduction thereof to transfer connections from a first set of contacts to a second set of contacts, a first indicator connected to said source by said relay through said first set of contacts to indicate the operation thereof, a resistance-capacitance network integrator circuit connected through said second set of contacts to said source by the energization of said first relay and responsive to the time of conduction of said first electron tube to produce a voltage output corresponding to the ratio of the time of charge to the time of discharge of said capacitance, means for coupling said bridge unbalance voltage pulses to bias said first tube to conduction whereby said first indicator is disconnected from said source and said integrator is connected to said source by the energization of said first relay for the time duration of said voltage pulse, a second electron tube biased from said source to be normally nonconducting, a second relay connected in the anode circuit of said second tube and energized upon the conduction thereof to transfer connections from a first set of contacts to a second set of contacts, means for applying the output potential of said integrator to bias said second electron tube to conduction for a value of gas flow exceeding a predetermined amount established by the bias applied to said second electron tube from said source, a second indicator connected through the first set of contacts of said second relay thereby to be energized whenever the rate of gas flow is lower than said predetermined amounts, and a third indicator connected through the second set of contacts of said second relay thereby to be energized whenever the value of gas flow exceeds said predetermined amount.

8. In volumetric gas flow measuring apparatus of the bubbling type wherein the flow of gas being measured is caused to pass in discrete volumes through a body of liquid, a rate-of-flow measuring circuit comprising a normally balanced alternating current bridge, a measuring cell adapted to divide the flow of gas into discrete bubbles of uniform size and having electrodes arranged to detect the passage of each gas bubble so formed, means for connecting said measuring cell into one arm of said bridge such that the passage of a gas bubble through said measuring cell unbalances said bridge to produce a voltage pulse having a time of duration corresponding to the time of passage of said bubble by said electrode, a source of energizing potentials, a first electron tube biased from said source to be normally nonconducting, a first relay connected in the anode circuit of said first tube and energized upon conduction thereof to transfer connections from a first set of contacts to a second set of contacts, a first indicator connected to said source by said relay through said first set of contacts to indicate the operation thereof, a resistance capacitance network integrator circuit connected through said second set of contacts to said source by the energization of said first relay and responsive to the time of conduction of said first electron tube to produce a voltage output corresponding to the ratio of the time of charge to the time of discharge of said capacitance, means for coupling said bridge unbalance voltage pulses to bias said first tube to conduction whereby said first indicator is disconnected from said source and said integrator is connected to said source by the energization of said first relay for the time duration of said voltage pulse, a second electron tube biased from said source to be normally nonconducting, a second relay connected in the anode circuit of said second tube and energized upon the conduction thereof to transfer connections from a first set of contacts to a second set of contacts, means for applying the output potential of said integrator to bias said second electron tube to conduction for a value of gas flow exceeding a predetermined amount established by the bias applied to said second electron tube from said source, means to adjust the bias of said second electron tube to compensate said preetermined amount for changes in ambient temperature, a second indicator connected through the first set of contacts of said second relay thereby to be energized from said source when the rate of gas flow is lower than said predetermined amount, and a third indicator connected through the second set of contacts of said second relay to be energized from said source whenever the value of gas flow exceeds said predetermined amount.

References Cited in the file of this patent

UNITED STATES PATENTS

| | | |
|---|---|---|
| 2,199,189 | Scheldorf | Apr. 30, 1940 |
| 2,305,845 | Cockerell | Dec. 22, 1942 |
| 2,340,751 | Holmes | Feb. 1, 1944 |
| 2,374,248 | Tuttle | Apr. 24, 1945 |
| 2,473,922 | Robias | June 21, 1949 |
| 2,507,359 | Weisz | May 9, 1950 |
| 2,578,347 | Gagnaire | Dec. 11, 1951 |
| 2,594,668 | Mannal | Apr. 29, 1952 |